US008914673B2

(12) United States Patent
Hachmeister et al.

(10) Patent No.: US 8,914,673 B2
(45) Date of Patent: Dec. 16, 2014

(54) DISTRIBUTED TESTING WITHIN A SERIAL TESTING INFRASTRUCTURE

(75) Inventors: Damon Hachmeister, North Grafton, MA (US); Adam Jenkins, Marlborough, MA (US); Sudarshan Raghunathan, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 331 days.

(21) Appl. No.: 13/400,132

(22) Filed: Feb. 20, 2012

(65) Prior Publication Data

US 2013/0219226 A1    Aug. 22, 2013

(51) Int. Cl.
*G06F 11/00* (2006.01)
(52) U.S. Cl.
USPC .............................................. 714/25; 714/30
(58) Field of Classification Search
CPC .... G06F 11/22; G06F 11/2205; G06F 11/263
USPC ............................................... 714/25, 30, 31
See application file for complete search history.

(56) References Cited

U.S. PATENT DOCUMENTS

| 5,884,023 | A * | 3/1999 | Swoboda et al. ............... 714/30 |
| 7,543,184 | B2 | 6/2009 | Dean et al. |
| 7,550,988 | B2 | 6/2009 | Schroth et al. |
| 7,646,721 | B2 * | 1/2010 | Archer et al. ................. 370/242 |
| 7,797,669 | B1 * | 9/2010 | Rehof et al. .................. 717/100 |
| 7,810,001 | B2 | 10/2010 | Zhou et al. |
| 2002/0152438 | A1 * | 10/2002 | Terry ............................. 714/726 |
| 2004/0250150 | A1 * | 12/2004 | Swoboda et al. ............. 713/330 |
| 2006/0085699 | A1 * | 4/2006 | Hathorn et al. ................ 714/56 |
| 2006/0212759 | A1 * | 9/2006 | Campbell et al. ............... 714/38 |
| 2007/0233765 | A1 * | 10/2007 | Gupta et al. .................. 708/446 |
| 2009/0043540 | A1 | 2/2009 | Faraj |
| 2011/0099424 | A1 * | 4/2011 | Rivera Trevino et al. ...... 714/25 |
| 2012/0137370 | A1 * | 5/2012 | Guruswamy ................... 726/25 |

OTHER PUBLICATIONS

Gropp, et al., "A high-performance, portable implementation of the MPI message passing interface standard", Retrieved at <<http://www-public.int-evry.fr/~gibson/Teaching/CSC5021/ReadingMaterial/GroppLDS96.pdf>>, Proceedings of Parallel Computing, 1996, pp. 789-828.
Keller, et al., "Testing the correctness of MPI implementations", Retrieved at <<http://ieeexplore.ieee.org/stamp/stamp.jsp?tp=&arnumber=4021939>>,Proceedings of the Fifth International Symposium on Parallel and Distributed Computing, 2006. ISPDC '06, 2008, pp. 291-295.

(Continued)

*Primary Examiner* — Joshua Lohn
(74) *Attorney, Agent, or Firm* — Kevin Sullivan; Kate Drakos; Micky Minhas

(57) ABSTRACT

A serial testing infrastructure includes the capability to execute a distributed test on multiple virtual processors. A test executable may be stored in a library and the test description, including the name of the test, the test library, and other test characteristics, may be stored in a separate test data file. The serial testing infrastructure initiates multiple distributed test executors that each launch an instance of the distributed test as a process that runs concurrently with other instances of the distributed test. Each distributed test executor monitors execution of it corresponding process until completion or timeout.

20 Claims, 6 Drawing Sheets

(56) References Cited

OTHER PUBLICATIONS

Cottam, et al., "Representing Unit Test Data for Large Scale Software Development", Retrieved at <<http://osl.iu.edu/publications/prints/2008/Cottam2008UnitTest.pdf>>,Proceedings of SoftVis '08 Proceedings of the 4th ACM symposium on Software visualization, Sep. 16-17, 2008, pp. 57-66.

Gropp, et al., "Sowing mpich: a case study in the dissemination of a Portable environment for parallel scientific Computing", Retrieved at <<http://citeseerx.ist.psu.edu/viewdoc/download?doi=10.1.1.109.5875&rep=rep1&type=pdf>>, Proceedings of the International Journal of Supercomputer Applications and High Performance Computing, 1997, pp. 103-114.

* cited by examiner

DISTRIBUTED TESTING WITHIN A SERIAL TESTING INFRASTRUCTURE

BACKGROUND

Large scale software applications require continual testing to ensure that the applications generate consistent results. Functional testing is typically used during development to test functions, methods, features, and/or the complete application with various inputs. Regression testing is typically used after development of the application to test correctness of the application and the quality of the output. A large number of tests may be used to test a large scale software application. Each test may include various runtime options, numerous settings, and a large volume of testing data that increases the complexity and dimension of the testing process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A serial testing infrastructure, used to automate testing of software applications, includes the capability to launch a distributed test into multiple processes that execute concurrently using a message passing model of communication. The serial testing infrastructure may utilize several instances or processes of a distributed test executor, where each instance of a distributed test executor launches an instance or process of the distributed test. Each instance of a distributed test executor monitors an instance of the distributed test until completion or timeout. The distributed test executors may be initiated through an invocation of a message passing executable that also sets up a message passing environment for each of the distributed test processes to communicate. The format to invoke the message passing executable may be prepared by a serial-to-distributed test adapter from a description of a particular test run.

A test data file may be used to describe each test that is executed by the serial testing infrastructure. The test executable may be stored in a testing library that is distinct from the test data file. A serial test executor reads the test data file to obtain the information describing a test run which is then passed to a serial-to-distributed test adapter. The serial-to-distributed test adapter formats an invocation to a message passing executable to initiate execution of the multiple distributed test executors. Each distributed test executor, in turn, launches an instance of the distributed test (i.e., process) which is executed concurrently with the other instances of the distributed test. Upon completion of each process, the corresponding distributed test executor returns test results, pertaining to the outcome of the distributed test run, to the serial-to-distributed test adapter. The serial-to-distributed test adapter prepares the test results for the serial test executor which provides them to the intended user.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
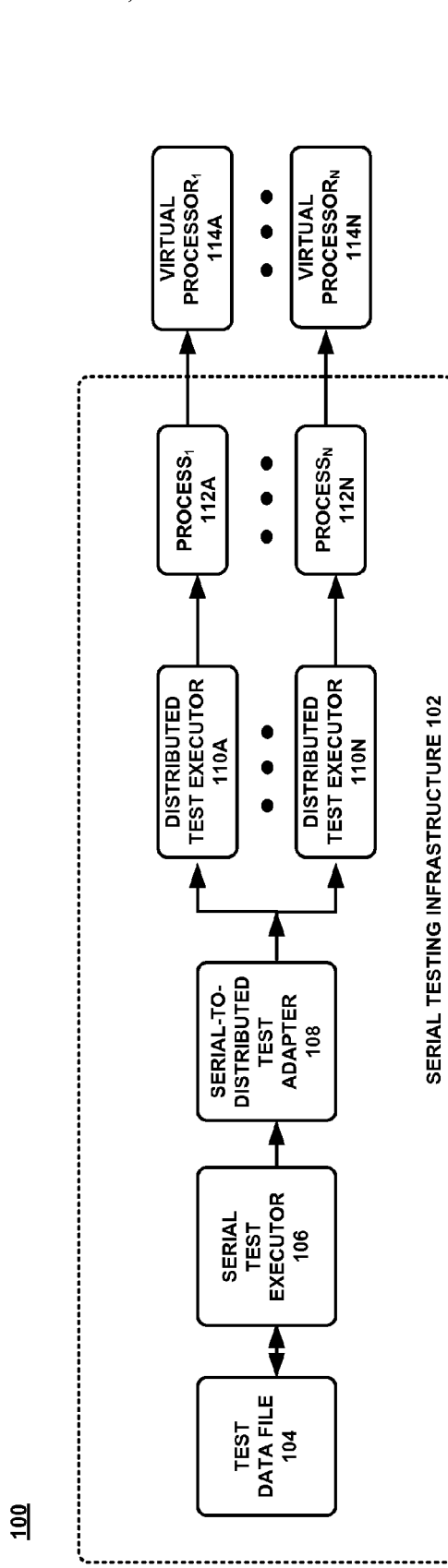
FIG. 1 illustrates a first exemplary system for executing a distributed test within a serial testing infrastructure.

Various embodiments pertain to a technology facilitating the execution of a distributed test within a serial testing infrastructure. A serial testing infrastructure is a testing environment that only has the capability of executing tests serially, that is, where only one process is executed at a time. A distributed test is an executable program that can be distributed into several processes that execute concurrently. Each process has its own local memory and communicates with other processes through message passing. The embodiments provide a serial testing infrastructure with the capability to execute a distributed test in addition to serially-executed tests thereby providing a more robust testing environment.

In one or more embodiments, the distributed test may be implemented as an executable function that is contained in a specific entry point or location in a library. A test data file may be used to specify a particular test run in the form of test characteristics that describe the requirements to execute a test. The test characteristics may include, without limitation, input data, parameter settings, number of processes, and other information regarding the desired runtime environment for the test run (e.g., configuration of the hardware resources used to run the test). The test data file may also specify the particular executable function or test to execute, the location of the library where the executable function is located, and a distributed test executor that generates the distributed runtime. The placement of the testing information in the test data file and the distributed test in a separate library enables a user to more easily run the same test in a variety of configurations.

Each instance of the distributed test may be implemented as a process that shares data and communicates with other processes through a message passing model of communication. In one or more embodiments, the message passing interface (MPI) may be used to set up a message passing execution environment for a test run. MPI is a standard developed by the MPI Forum that specifies a message passing model of communication between multiple processes. Some implementations of the MPI standard are tailored for a particular parallel machine platform (e.g., IBM, Linux-based cluster, Cray, Sun, and SGI architectures) while others are platform independent (e.g., Microsoft® MPI, etc.). A MPI implementation may be composed of a set of library routines (e.g., application programming interfaces (APIs), classes, methods, etc.) that implement the features of the MPI specification. The APIs may be stored in a library that may be called from an external application, such as a distributed test. However, the MPI library routines adhere to a specific format which may not be executable within the serial testing infrastructure.

The serial testing infrastructure may utilize a serial-to-distributed test adapter to generate multiple distributed test executors that recognize the MPI requirements for a test run, monitor the execution of each instance of a distributed test, and report back the outcome of the distributed test.

Attention now turns to a more detailed description of an exemplary system for executing distributed tests within a serial testing infrastructure. FIG. 1 illustrates a block diagram of an exemplary system 100 that includes a serial testing infrastructure 102 that may be composed of a test data file 104, a serial test executor 106, a serial-to-distributed test adapter 108, multiple distributed test executors 110A-110N, and one or more processes 112. Although the system 100 as shown in FIG. 1 has a limited number of elements in a certain topology, it may be appreciated that the system 100 may include more or less elements in alternate topologies as desired for a given implementation.

The serial testing infrastructure 102 may be embodied within a computing device. The computing device may be any type of electronic device capable of executing programmable instructions such as, without limitation, a mobile device, a personal digital assistant, a mobile computing device, a smart phone, a cellular telephone, a handheld computer, a server, a server array or server farm, a web server, a blade server, a network server, an Internet server, a work station, a mini-computer, a mainframe computer, a supercomputer, a network appliance, a web appliance, a distributed computing system, multiprocessor systems, or combination thereof.

The serial testing infrastructure 102 may be configured to execute serial and parallel tests. The serial testing infrastructure 102 may be implemented as part of an integrated development environment, a stand-alone application, as part of an operating system, and so forth. The embodiments are not limited in this manner.

A test data file 104 may be used to describe a test that is to be performed along with the testing environment, input data, settings, parameters, and so forth (i.e., test characteristics). The test data file 104 may contain data that describes one or more tests. In addition, the test data file 104 may include information about the expected outputs of a test. For example, the test data file 104 may describe a negative test case where a specific error is to occur during test execution. The tests may be distributed tests (i.e. concurrent or parallel program) and/or a serially-executed test.

Table 1 below illustrates an exemplary test data file 104. In this example, the data for a distributed test is stored in tabular form in an Extensible Markup Language (XML) file. However, it should be understood that the embodiments are not limited to an XML file and that the test data file may be embodied in other forms, such as without limitation, a Java Script Object Notation (JSON) file, an Asynchronous Java Script and XML (AJAX) file, Extensible Application Markup Language (XAML) file, database table, excel spreadsheet, comma-separated values, and the like. Furthermore, the data describing a distributed test is not limited to a file structure and may be described graphically.

TABLE 1

| | |
|---|---|
| <?xml version = "1.0"?> | (1) |
| <Data> | (2) |
|   <ParameterTypes> | (3) |
|     <ParameterType Name="DLLName">String<?ParameterType> | (4) |
|     <ParameterType Name="FunctionName">String | (5) |
|   <?ParameterType> | |
|     <ParameterType Name="MPIData">String<?ParameterType> | (6) |
|   </ParameterTypes> | (7) |
| <Table Id="DistributedRuntimeBasic"> | (8) |
|   <Row Name="TestGetNProcs_4N" TestType=Regression"> | (9) |
|      | (10) |

TABLE 1-continued

| | |
|---|---|
|      | (11) |
|      | (12) |
|   </Row> | (13) |
| </Table> | (14) |
| </Data> | (15) |

The test data file 104 shown in Table 1 above, declares several parameters in lines 3-8. In particular, line 4 declares the string "DLLName" as a parameter. It is used to indicate the test library where the test executable resides. In line 5, the string "FunctionName" is declared as a parameter and it is used to identify the function within the library that is the test executable. Similarly, in line 6, the string "MPIData" is declared as a parameter and it is used to identify the parameter settings for the MPI environment.

In this example, each test is described in a row of the table named "DistributedRuntimeBasic" identified in line 8. The test is described in lines 9-12. Line 10 indicates that the test is found in the library named TEST. Line 11 indicates that the test is the function TEST1 which is within the library TEST.DLL. Line 12 sets the parameter MPIData to the string "–n 4" which is used to indicate that four processes are to be used in this test run.

As shown in Table 1, the test data file 104 allows a user to construct each test in a variety of configurations. The configurations are easily programmable by specifying different parameters, settings, options, and input data in the table. The use of a separate file distinct from the distributed test executable provides more flexibility in the configuration of the test runs.

The serial test executor 106 reads each row of the test data file 104 and transmits the information stored in each row to the serial-to-distributed adapter 108. In one or more embodiments, the serial test executor 106 may be part of an existing testing framework that does not have the capability to execute a distributed test. In this case, the serial-to-distributed test adapter 108 initiates execution of multiple distributed test executors 110A-110N (collectively, 110). The number of distributed test executors may be a setting specified in the test data file 104. Each distributed test executor 110 launches an instance of the distributed test as a process and monitors execution of the process until completion.

Each process, 112A-112N (collectively, 112) may execute on a dedicated virtual processor 114A-114N (collectively, 114). A virtual processor 114 is a representation of a processing unit to an operating system. A processing unit may be implemented as a core within a multi-core processor, a single processor, a processing element within a multiprocessor environment, and so forth. A physical processor, on a single integrated circuit (IC), may be composed of one or more cores. A core is an independent processing unit capable of executing programmable instructions. For example, a dual-core processor has two cores in a single IC and a quad-core processor has four cores in a single IC. Furthermore, a collection of cores may be logically grouped into a node where the cores in a node share a single address space. The cores may physically reside in one or more computing devices. At runtime, the operating system maps a virtual processor 114 to a physical processing unit.

In various embodiments, the system 100 described herein may comprise a computer-implemented system having multiple elements, programs, procedures, modules. As used herein, these terms are intended to refer to a computer-related entity, comprising either hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. By way of illustration, both an application running on a server and the server may be an element. One or more elements may reside within a process and/or thread of execution, and an element may be localized on one computer and/or distributed between two or more computers as desired for a given implementation. The embodiments are not limited in this manner.

The various elements of system 100 may be communicatively coupled via various types of communications medium as indicated by various lines or arrows. The elements may coordinate operations between each other. The coordination may involve the uni-directional or bi-directional exchange of information. For instance, the elements may communicate information in the form of signals communicated over the communications medium. The information may be implemented as signals allocated to various signal lines. In such allocations, each message is a signal. Further embodiments, however, may alternatively employ data messages. Such data messages may be sent via various connections. Exemplary connections include parallel interfaces, serial interfaces, and bus interfaces.

Figure 2:
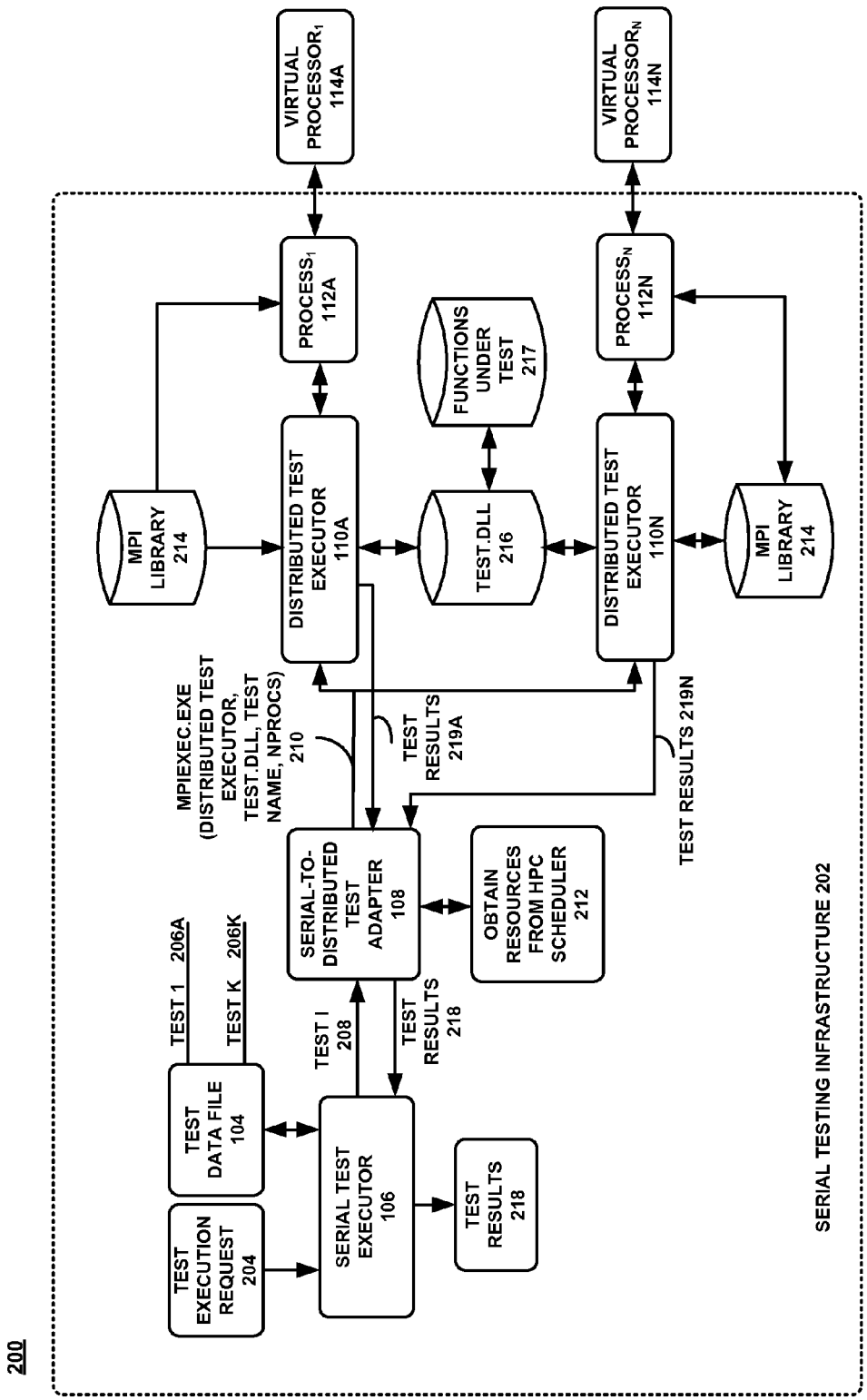
FIG. 2 illustrates a second exemplary system for executing a distributed test within a serial testing infrastructure.

FIG. 2 illustrates another exemplary embodiment of a system 200 for executing a distributed test within a serial testing infrastructure. For illustration purposes, the system 200 may be part of a high performance computing (HPC) cluster that utilizes a MPI executable to launch a distributed test. However, it should be noted that the embodiments are not tailored to the use of the MPI executable and that other parallel software tools may be used such as, without limitation, Parallel Virtual Machine (PVM), Open Message Passing (OpenMP), and the like. Furthermore, although the system 200 as shown in FIG. 2 has a limited number of elements in a certain topology, it may be appreciated that the system 200 may include more or less elements in alternate topologies as desired for a given implementation.

Referring to FIG. 2, a user (e.g., developer, tester, programmer, etc.) may utilize a serial testing infrastructure 202 to submit a test execution request 204. A test data file 104 may include multiple tests, TEST 1 206A through TEST K 206K, where data pertaining to each test may be stored in a row in the test data file 104. The serial test executor 106 reads each row in the test data file 104, and submits the test data contained in the row, TEST I 208, to the serial-to-distributed test adapter 108. The serial test executor 106 may then wait for the completion of the test before submitting the next test to the serial-to-distributed test adapter 108. Alternatively, the serial test executor 106 may read the next row in the test data file 104 and submit the test data to the serial-to-distributed test adapter 108 before the previous test is completed.

The serial-to-distributed test adapter 108 reads the test data and converts it into a format used to call or invoke a MPI executable. The MPI executable may be invoked using the MPIEXEC.EXE with the parameters needed to make the invocation. For example, the function call MPIEXEC.EXE (DISTRIBUTED TEST EXECUTOR, TEST.DLL, TESTNAME, NPROCS) may be used to invoke the MPI executable to invoke multiple distributed test executors 110, to execute the distributed test, Test Name, found in the library, Test.DLL 216, with the number of processes identified in the parameter, NPROCS.

The MPIEXEC.EXE call may be submitted to a high performance computing (HPC) scheduler that obtains the hardware resources needed to execute the distributed test (block 212). A HPC scheduler may be used in a HPC environment (e.g., cluster) to obtain the resources, such physical cores, memory, I/O, etc., for a test run prior to execution of the test run. A HPC cluster is a configuration of computing devices that share resources in which each computing device may be referred to as a node. The HPC scheduler may be a dedicated node in a cluster that has the task of assigning resources for each job (e.g., test, run, process) that executes in the cluster. Examples of commonly-used HPC schedulers are the Microsoft® HPC Scheduler, the Sun Grid Engine, the Load Sharing Framework (LSF), the Portable Batch System (PBS), Torque, and so forth.

Once the HPC scheduler obtains the resources, the HPC scheduler initiates execution of the MPIEXEC.EXE call which, in turn, generates multiple instances or processes (i.e., NPROCS) of the distributed test executor 110A-110N (collectively, 110). Each distributed test executor 110 initializes a MPI environment by specifying the type of message passing the test run requires, such as synchronous send, blocking send/blocking receive, non-blocking send/receive, buffered send, combined send/receive, and read send. Each distributed test executor 110 monitors execution of a corresponding distributed test process until the distributed test process 112 finishes processing or times out. In some situations, the distributed test executor 110 or the serial-to-distributed test adapter 108 may initiate a stall mechanism that will terminate a distributed test process if any one of the distributed test processes 112 executes for an exceeding long time.

Each distributed test executor 110 and the distributed test processes, process 1 to process N, 112A-112N, utilize the MPI library 214 to access MPI-implemented executables (e.g., classes, methods, functions subroutines, etc.). Each distributed test executor 110 accesses the library, TEST.DLL 216, where the distributed test resides, to launch an instance of the distributed test.

The distributed test is used to test functions under test 217. The functions under test 217 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Each process, process 1 to process N, 112A-112N, executes on a dedicated virtual processor, virtual processor 1-virtual processor N, 114A-114N. An operating system may map each virtual processor, 114A-114N, to a physical processing unit (e.g., processor, core, etc.).

Each distributed test executor 110 monitors the execution of its corresponding process until completion or timeout. An instance of a distributed test may execute successfully or fail. A test status may be returned from the MPIEXEC.EXE call that indicates the result of the test run, such as, failure or successful completion. Additional information from the test run may also be returned from the MPIEXEC.EXE call. One or more of the distributed test processes may have failed and additional information regarding the failure may be provided back to the user. The test status and additional information, referred to as test results 219A-219N (collectively, 219), may be passed from each distributed test executor 110 to the serial-to-distributed test adapter 108 which converts the information into a format recognizable by the serial test executor 106. The serial test executor 106 provides the test results 218 to the user.

The various elements of system 200 may be communicatively coupled via various types of communications medium as indicated by various lines or arrows. The elements may coordinate operations between each other. The coordination may involve the uni-directional or bi-directional exchange of information. For instance, the elements may communicate information in the form of signals communicated over the communications medium. The information may be implemented as signals allocated to various signal lines. In such allocations, each message is a signal. Further embodiments, however, may alternatively employ data messages. Such data messages may be sent various connections. Exemplary connections include parallel interfaces, serial interfaces, and bus interfaces.

In various embodiments, the system 200 described herein may comprise a computer-implemented system having multiple elements, programs, procedures, modules. As used herein, these terms are intended to refer to a computer-related entity, comprising either hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. By way of illustration, both an application running on a server and the server may be an element. One or more elements may reside within a process and/or thread of execution, and an element may be localized on one computer and/or distributed between two or more computers as desired for a given implementation. The embodiments are not limited in this manner.

Operations for the embodiments may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 3:
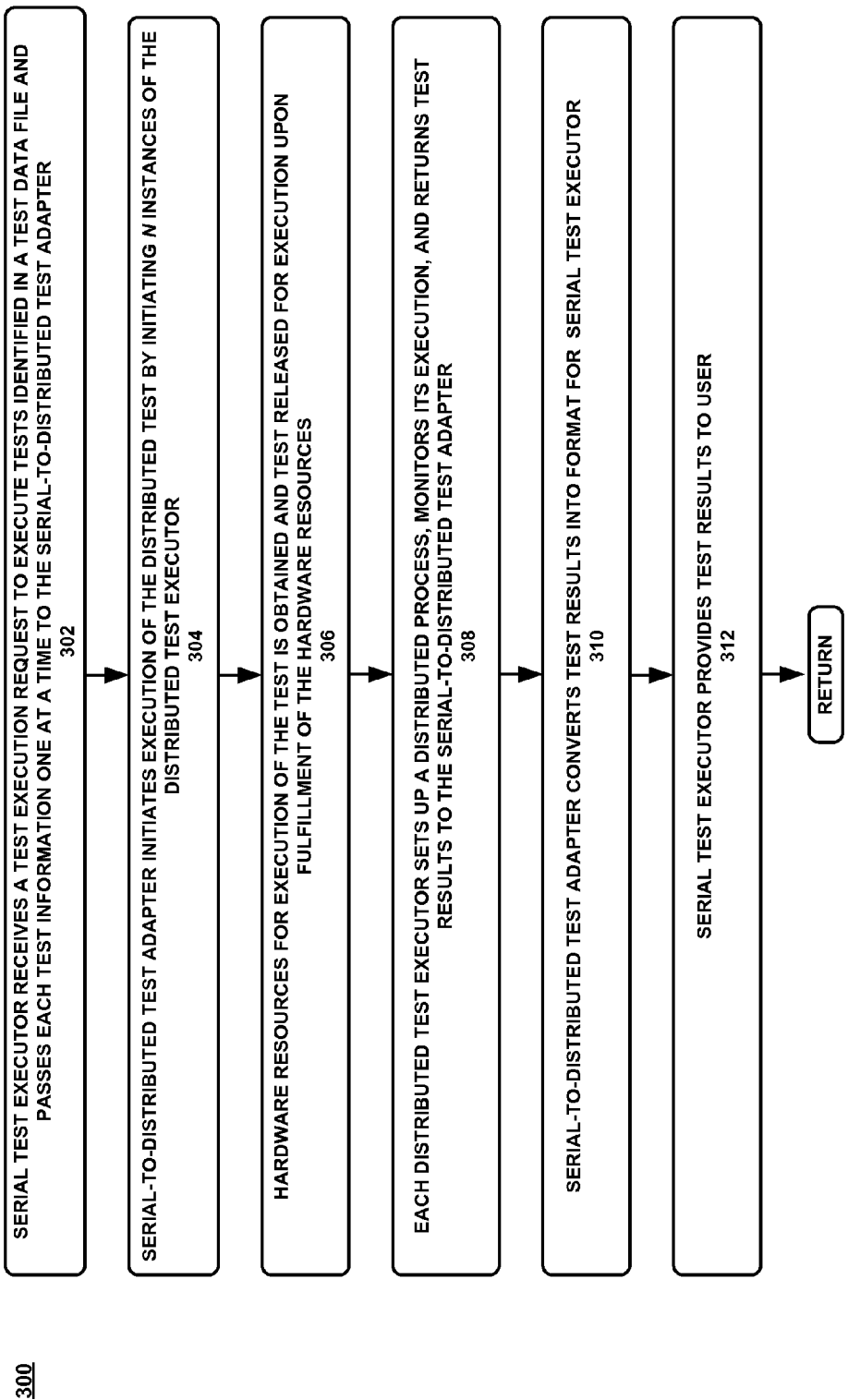
FIG. 3 is a flow diagram illustrating an exemplary method for executing a distributed test within a serial testing infrastructure.

Referring to FIG. 3, a serial test executor 106 reads each test from the test data file 104 and passes each test's information or test characteristics, one at a time, to the serial-to-distributed test adapter 108 (block 302). The serial-to-distributed adapter 108 may initiate multiple distributed test executors 110 to facilitate execution of the distributed test (block 304). The serial-to-distributed adapter 108 may interact with a HPC scheduler to obtain the needed hardware resources before the distributed test executors 110 execute (block 306). Each distributed test executor 110 initiates an instance of the distributed test as a process and monitors execution of the process until completion or timeout (block 308). Each distributed test executor 110 returns an outcome of the distributed test, such as a test status and/or related test information, as test results 219, which are passed back to the serial-to-distributed adapter 108 (block 308). The serial-to-distributed adapter 108 converts the test results from each distributed test executor 110 into a format recognizable by the serial test executor 106 (block 310). The serial test executor 106, upon receipt of the test results, provides the information to the user (block 312).

Figure 4:
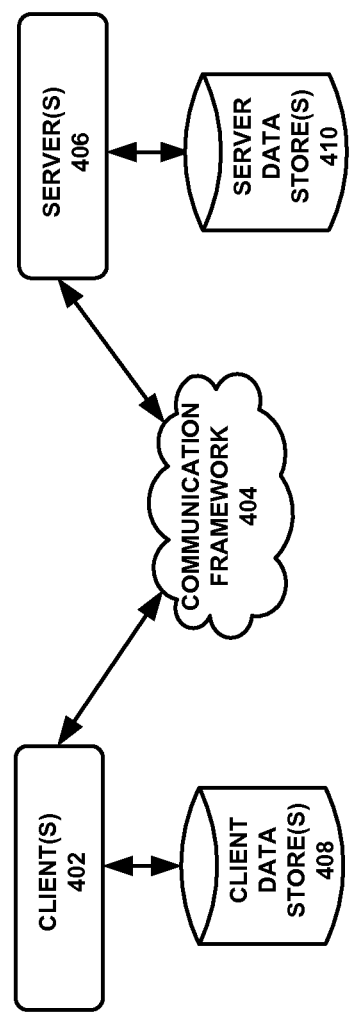
FIG. 4 is a block diagram illustrating a first operating environment.

Attention now turns to a discussion of an exemplary operating environment. FIG. 4 illustrates a first operating environment 400. It should be noted that the operating environment 400 is exemplary and not intended to suggest any limitation as to the functionality of the embodiments. The embodiments may be applied to an operating environment 400 having one or more client(s) 402 in communication through a communications framework 404 with one or more server(s) 406. The operating environment 400 may be configured in a network environment, a distributed environment, a multiprocessor environment, or a stand-alone computing device having access to remote or local storage devices.

A client 402 may be embodied as a hardware device, a software module, or a combination thereof. The client 402 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The client 402 may also be embodied as a software module having instructions that execute in a single execution path, multiple concurrent execution paths (e.g., thread, process, etc.), or in any other manner.

A server 406 may be embodied as a hardware device, a software module, or as a combination thereof. The server 406 may be any type of electronic device capable of executing programmable instructions such as, without limitation, a mobile device, a personal digital assistant, a mobile computing device, a smart phone, a cellular telephone, a handheld computer, a server, a server array or server farm, a blade server, a web server, a network server, an Internet server, a work station, a mini-computer, a mainframe computer, a supercomputer, a network appliance, a web appliance, a distributed computing system, multiprocessor systems, or combination thereof. The server 406 may also be embodied as a software module having instructions that execute in a single execution path, multiple concurrent execution paths (e.g., thread, process, etc.), or in any other manner.

The communications framework 404 facilitates communications between the clients 402 and the servers 406. The communications framework 404 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators). A client 402 and a server 406 may include various types of standard communication elements designed to be interoperable with the communications framework 404, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

Each client(s) 402 may be coupled to one or more client data store(s) 408 that store information local to the client 402. Each server(s) 406 may be coupled to one or more server data store(s) 410 that store information local to the server 406.

Figure 5:
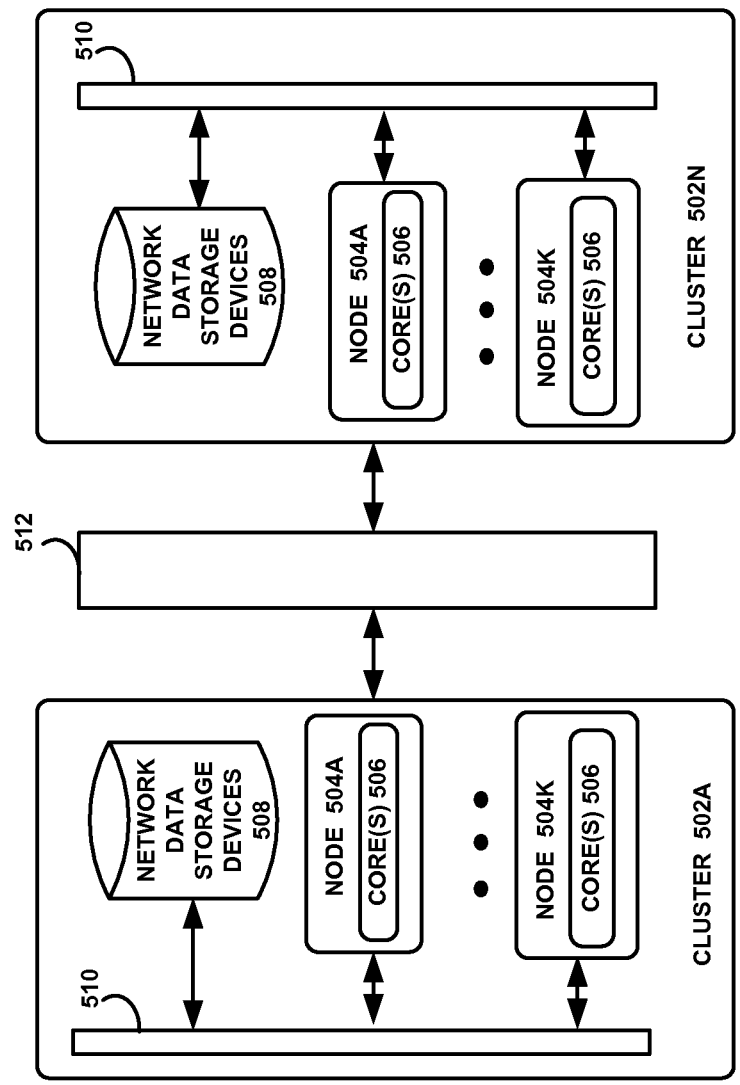
FIG. 5 is a block diagram illustrating a second operating environment.

FIG. 5 illustrates a second operating environment 500. It should be noted that the operating environment 500 is exemplary and not intended to suggest any limitation as to the functionality of the embodiments. The embodiments may be applied to an operating environment 500 that contains one or more clusters 502A-502N (collectively, 502). Each cluster 502 may be communicatively coupled through an inter-cluster interconnect 512.

A cluster may contain one or more nodes 504A-504K (collectively, 504) and one or more network data storage devices 508, communicatively coupled to a cluster interconnect 510. Each node 504 may contain one or more cores 506. A core 506 is an independent processing unit that has the capability to execute programmable instructions. Multiple cores 506 may reside on one or more integrated circuits that are within a node 504 (e.g., multicore processors, multiprocessors, etc.) A node 504 may be implemented as a computing device.

In one or more embodiments, the serial testing infrastructure 102, 202 may be configured to execute within one cluster and utilize virtual processors that are from within the same cluster as the serial testing infrastructure and/or outside of the cluster. The embodiments are not limited to any particular configuration of a cluster.

The cluster interconnect 510 and the inter-cluster interconnect 512 may embody any well-known communication techniques, such as techniques suitable for use with packet-switched networks and circuit-switched networks, or a combination of packet-switched networks and circuit-switched networks, with suitable gateways and translators. A node 504 may include various types of standard communication elements designed to be interoperable with a cluster interconnect 510 or inter-cluster interconnect 512, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

Figure 6:
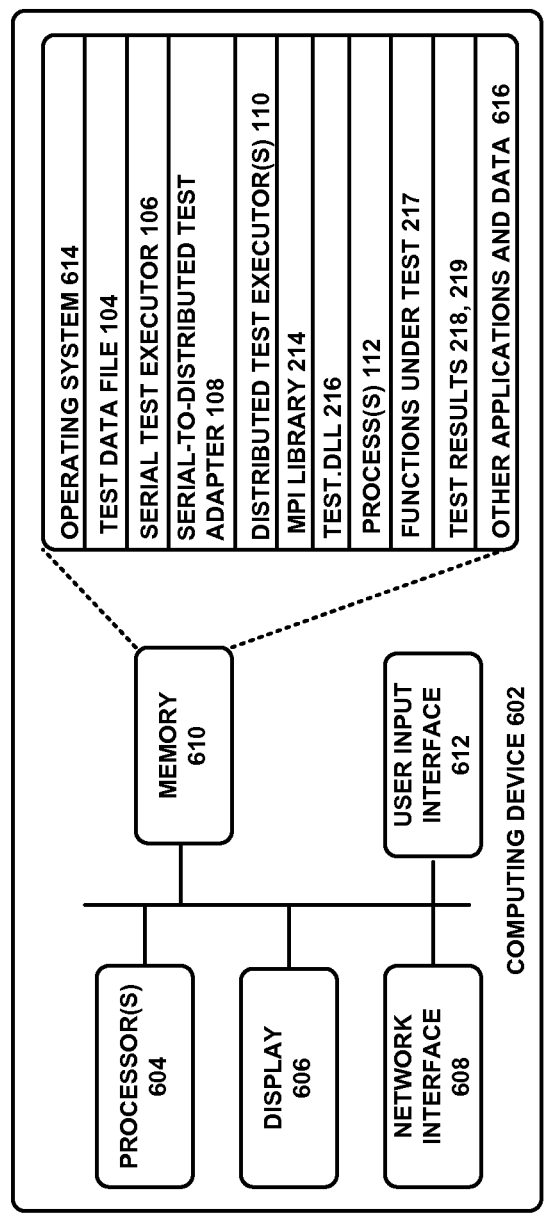
FIG. 6 is a block diagram illustrating an exemplary computing device.

FIG. 6 illustrates a block diagram of an exemplary computing device 602. The computing device 602 may be implemented as a node in a cluster, as a client device, as a stand-alone computing device, and so forth. The computing device 602 may have one or more processors 604, a display 606, a network interface 608, a memory 610, and a user input interface 612. A processor 604 may be any commercially available processor and may include dual or quad microprocessors, multi-core processors, and multi-processor architectures. The display 606 may be any visual display unit. The network interface 608 facilitates wired or wireless communications for the computing device 602 to communicate with other devices. The user input interface 612 facilitates communications between the computing device 602 and input devices, such as a keyboard, mouse, pointer, and the like and may receive input through a gesture, touch, voice, and the like.

The memory 610 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 610 may also include one or more external storage devices or remotely located storage devices. The memory 610 may contain instructions and data as follows:

an operating system 614;
a test data file 104;
serial test executor 106;
serial-to-distributed test adapter 108;
distributed test executor(s) 110;
MPI library 214;
TEST.DLL 216;
one or more processes 112;
functions under test 217;
test results 218, 219; and
various other applications and data 616.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

What is claimed:

1. A computer-implemented method, comprising:
   obtaining test characteristics for a distributed test within a serial testing infrastructure, the distributed test capable of execution as more than one process, each process capable of executing concurrently with other processes;

utilizing a serial-to-distributed adapter to initiate execution of multiple distributed test executors through an invocation to a message passing executable, each distributed test executor having a capability to initiate a process that executes an instance of a distributed test, the message passing executable facilitating communications between multiple processes; and initiating, by each distributed test executor, execution of a process that runs an instance of the distributed test concurrently with other processes.

2. The computer-implemented method of claim 1, further comprising:

reading the test characteristics from a first source and dynamically loading the distributed test from a second source, the first source and the second source being different.

3. The computer-implemented method of claim 2, further comprising:

loading the message passing executable from a third source, the third source being different from the first source and the second source.

4. The computer-implemented method of claim 1, further comprising:

obtaining a predetermined number of virtual processors prior to execution of the distributed test, the predetermined number of virtual processors obtained from the test characteristics, each process running on a dedicated virtual processor.

5. The computer-implemented method of claim 1, further comprising:

monitoring, by each distributed test executor, execution of a process until completion.

6. The computer-implemented method of claim 5, further comprising:

generating, by each distributed test executor, test results associated with a process.

7. A system, comprising:

a plurality of processing units communicatively coupled through an interconnect; and a memory including:

a serial testing infrastructure configured to execute processes serially, the serial testing infrastructure having a distributed test executor, that is launched from an invocation of a message passing interface (MPI) executable, the distributed test executor having instructions that when executed on a processing unit, initiates execution of a distributed test executable on multiple processing units.

8. The system of claim 7, further comprising:

a test library including one or more distributed test executables.

9. The system of claim 8, further comprising:

a test data file including at least one test characteristic, the test characteristic describing a distributed test run, the test library and the test data file being different.

10. The system of claim 9, further comprising:

a serial-to-distributed test adapter, including instructions that when executed on a processing unit, formats the invocation of the MPI executable in accordance with the test characteristic.

11. The system of claim 7, further comprising:

a message passing library including a plurality of message passing executables that facilitate message passing communications between processes.

12. The system of claim 7, the serial testing infrastructure further comprising a scheduler, communicatively coupled to the processing units, the scheduler, having instructions that when executed on a processing unit, obtains a predetermined number of processing units for use in executing a distributed test run.

13. The system of claim 7, the serial testing infrastructure further comprising a serial test executor, having instructions that when executed on a processing unit, obtains the test characteristics for a distributed test run and facilitates the serial-to-distributed test adapter to invoke the MPI executable in accordance with the test characteristics.

14. A computer-readable storage medium, not including propagating signals, including instructions that when executed on at least one processor performs actions, including:

obtaining test characteristics for a distributed test within a serial testing infrastructure, the distributed test capable of execution as more than one process, each process capable of executing concurrently with other processes;

utilizing a serial-to-distributed adapter to initiate execution of multiple distributed test executors through an invocation to a message passing executable, each distributed test executor having a capability to initiate a process that executes an instance of a distributed test, the message passing executable facilitating communications between multiple processes; and initiating, by each distributed test executor, execution of a process that runs an instance of the distributed test concurrently with other processes.

15. The computer-readable storage medium of claim 14, further comprising:

reading the test characteristics from a first source and dynamically loading the distributed test from a second source, the first source and the second source being different.

16. The computer-readable storage medium of claim 15, further comprising:

loading the message passing executable from a third source, the third source being different from the first source and the second source.

17. The computer-readable storage medium of claim 14, further comprising:

obtaining a predetermined number of virtual processors prior to execution of the distributed test, the predetermined number of virtual processors obtained from the test characteristics, each process running on a dedicated virtual processor.

18. The computer-readable storage medium of claim 14, further comprising:

monitoring, by each distributed test executor, execution of a process until completion.

19. The computer-readable storage medium of claim 14, further comprising:

generating, by each distributed test executor, test results associated with a process.

20. The computer-readable storage medium of claim 17, wherein the computer-readable storage medium is associated with a first cluster, and wherein at least one of the virtual processors is associated with a different cluster than the first cluster.

* * * * *